March 2, 1948. E. G. BAKER 2,437,181
ROTARY VALVE MOUNTING
Filed July 19, 1946 4 Sheets-Sheet 1

INVENTOR,
ERWIN G. BAKER,
By Herbert A. Minturn,
ATTORNEY.

March 2, 1948.  E. G. BAKER  2,437,181
ROTARY VALVE MOUNTING
Filed July 19, 1946  4 Sheets-Sheet 4
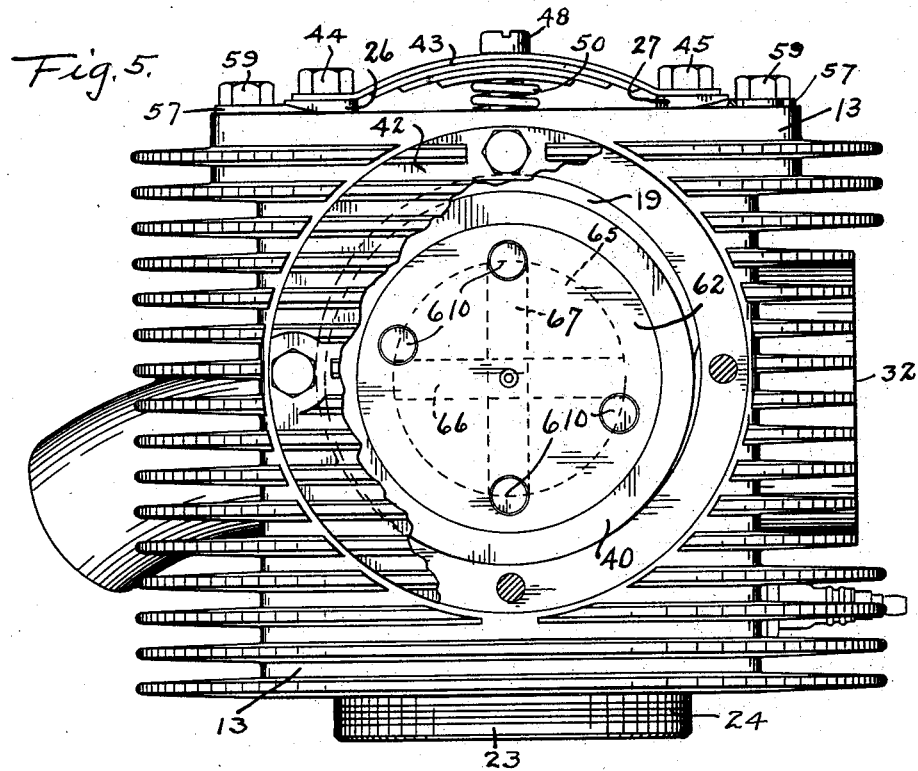
Fig. 5.
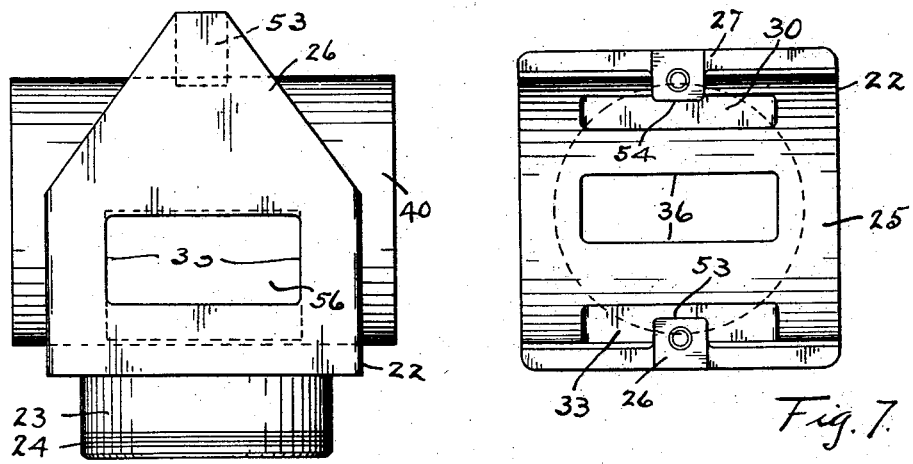
Fig. 6.
Fig. 7.
INVENTOR,
ERWIN G. BAKER,
By Herbert A. Minturn
ATTORNEY.

Patented Mar. 2, 1948

2,437,181

UNITED STATES PATENT OFFICE 2,437,181

ROTARY VALVE MOUNTING

Erwin G. Baker, Indianapolis, Ind.

Application July 19, 1946, Serial No. 684,882

8 Claims. (Cl. 123—80)

This invention relates to a gas engine and particularly to a floating cage for a rotary valve controlling both the intake and exhaust gases. A primary object of the invention is to provide means for carrying a rotary valve in such manner that it is yieldingly maintained on its seat at all times with a minimum pressure exerted on the valve itself in order that there be no appreciative loss of power simply in holding down the valve. The invention contemplates the use of a valve made out of an oil impregnated graphite composition which will withstand the high temperatures in the upper part of the combustion chamber of the engine without material deterioration, and which will produce an exceedingly smooth bearing surface with a very low coefficient of friction, all tending, by reason of that valve material, to be self-lubricating to eliminate loss of power in the driving of the valve.

A further primary object of the invention is to provide a simplified valve mounting and hold-down means which will, in effect, be floating in respect to the combustion chamber gas pressures against yielding members such as springs. In fact, the valve itself floats substantially between the imposed gas pressures and resisting springs with a minimum pressure of the valve itself directly upon its seat. The main object accomplished is the high degree of reduction in power required to drive the valve as opposed to heretofore employed rotary valve mounting systems.

Figure 1:
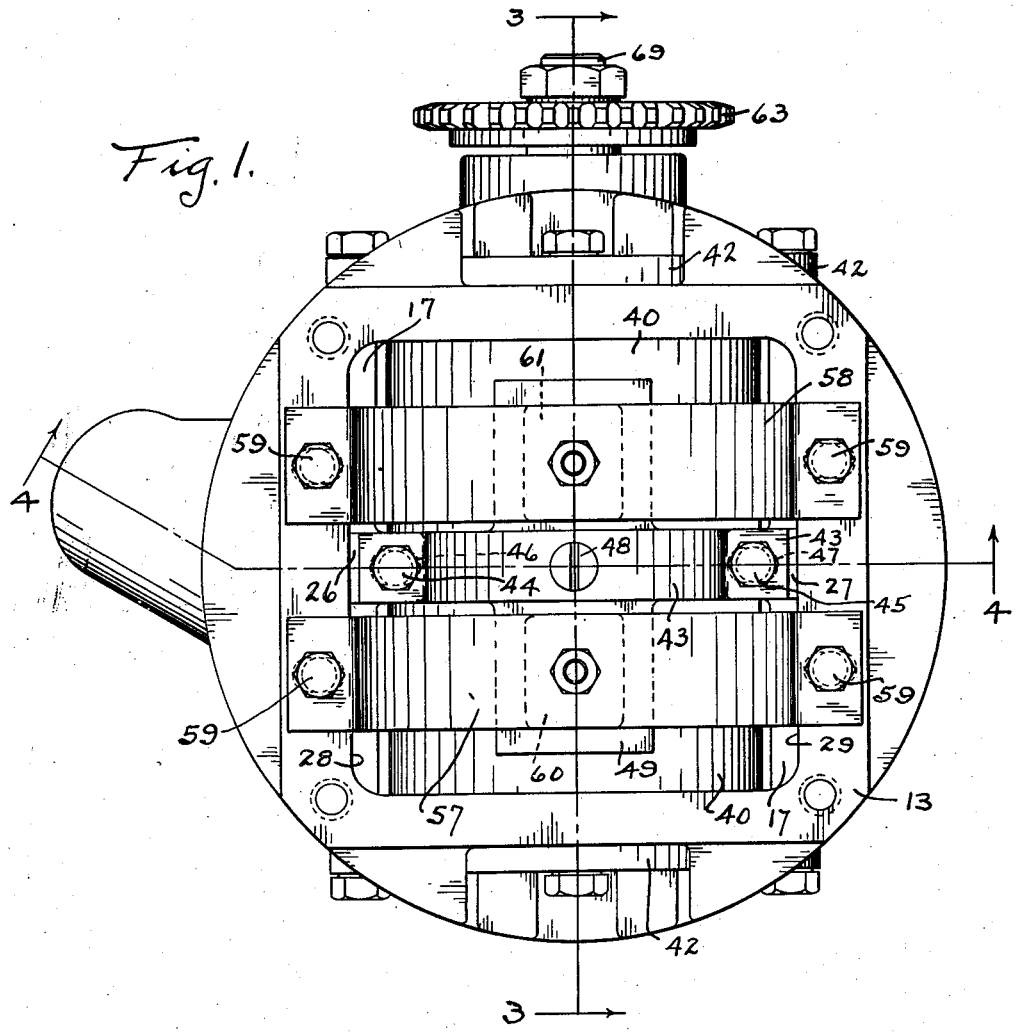
Figure 2:
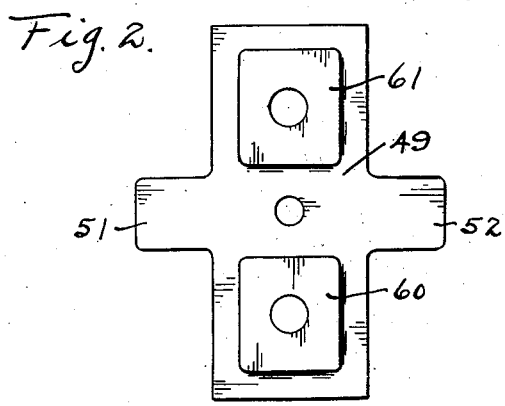
Figure 3:
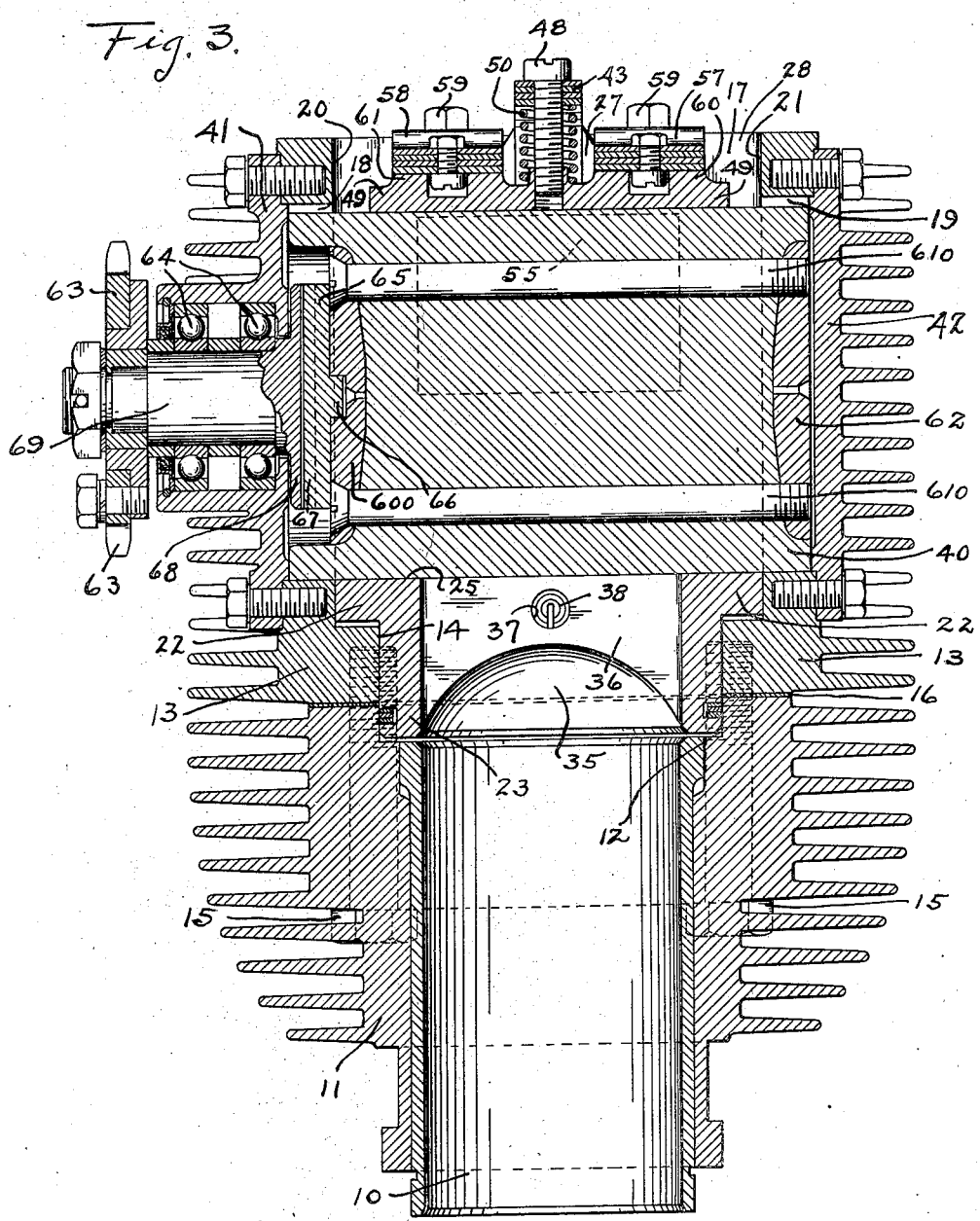
Figure 4:
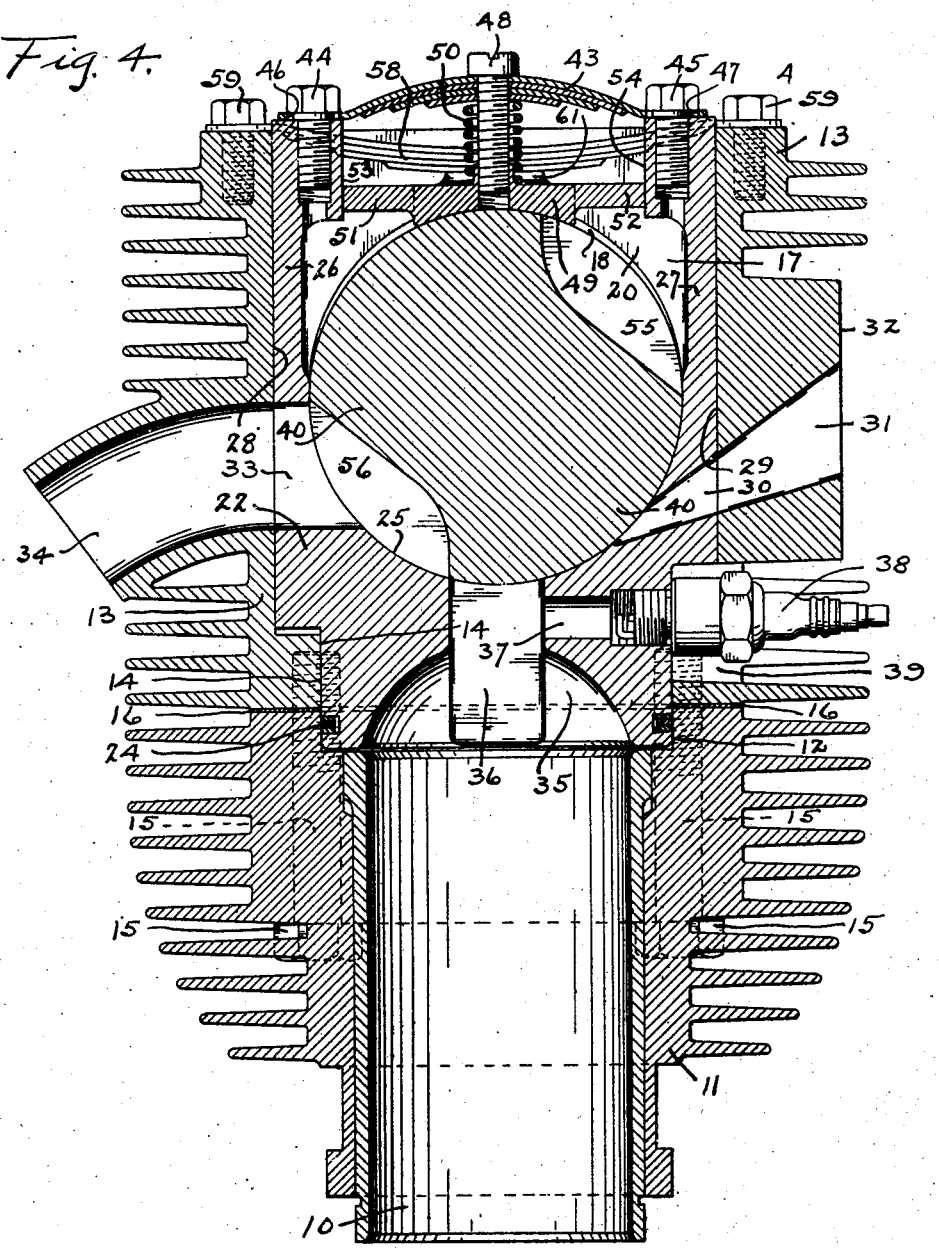

These and other objects and advantages of the invention will become apparent to those versed in the art in the following description of one particular form of the invention as now best known to me and as illustrated in the accompanying drawings, in which Fig. 1 is a top plan view of a structure embodying the invention with the cover plate removed;

Fig. 2, a top plan view of the valve seating shoe;

Fig. 3, a view in vertical central section on the line 3—3 in Fig. 1;

Fig. 4, a view in central vertical section on the line 4—4 in Fig. 1;

Fig. 5, a view in side elevation of the head removed from the cylinder;

Fig. 6, a view in side elevation from the intake side of the valve cage; and

Fig. 7, a top plan view of the valve cage.

Referring to the drawings, in which like characters indicate like parts, I have illustrated the invention as applied to an air-cooled type of engine wherein a cylinder sleeve 10 is inserted within a finned cylinder casting 11. The upper end of this casting 11 is counterbored to provide a bore 12 of larger diameter than that of the sleeve 10.

A cylinder head 13 likewise finned is provided with a bore 14 in its lower portion of the same diameter as that of the bore 12. The head 13 is secured to the cylinder casting 11 in any suitable manner to have the bores 12 and 14 axially aligned herein shown as by means of cap screws 15 extending upwardly through the casting 11 to screw-threadedly engage the under portion of the head 13. A gas-tight joint between the two castings is provided by any suitable means such as by a gasket 16.

The major portion of the head 13 is provided with an interior chamber opening through the top of the casting to be rectangular in transverse section above the bore 14. That is, the casting 13 has the major rectangular chamber designated by the numeral 17, the under side of which opens into the cylindrical bore 14. The head 13 is provided with circular openings 18 and 19, axially aligned, in opposite side walls 20 and 21 of this chamber 17.

A valve cage, generally designated by the numeral 22 is provided with a lower cylindrical extension 23 to fit slidingly within the bore 14, and is provided with means to effect a substantially gas-tight seal therebetween.

Such means in the present showing constitute sealing rings 24. The vertical height of this cylindrical section 23 equals substantially the vertical depth of the counterbore 12. Above the cylindrical section 23, the cage 22 is formed to have a valve seat 25 substantially semi-circular between two upwardly extending arms 26 and 27, the outer faces of which are planar to slidingly fit against the faces 28 and 29 of the chamber 17. Thus, the upper portion of the valve cage 22 is vertically slidable within the chamber 17 while the lower cylindrical portion 23 is vertically slidable within the bore 12, and the cage 22 is thus maintained against rotation about a vertical axis.

The upper portion of the cage 22, above the seat 25 and between the arms 26 and 27, is left open. The cage 22 is provided with a passageway 30 which opens by its inner end through the seat 25. The outer end of the passageway 30 registers generally with the passageway 31 which extends outwardly through the head 13. On the outer side of this head 13 is provided a face 32 against which a carburetor (not shown) may be mounted. Through the opposite side of the cage 22 extends a passageway 33 which opens inwardly through the valve seat 25 and outwardly to register generally with the exhaust passageway 34 provided in the head 13.

The under side of the cylindrically extending portion 23 is, in the present showing, provided with an entering dome shape chamber 35 to register by its lower margin substantially with the internal diameter of the sleeve 10. Then extending upwardly through this dome shape chamber 35 is a substantially rectangular passageway 36 opening through the valve seat 25 thereabove. Extending laterally from one side of this passageway 36 is a cylindrical passageway 37 communicating with the firing end of a spark plug 38, screw-threadedly carried by the cage 22. The head 13 is provided with an enlarged bore 39 for clearance around the plug 38, Fig. 4. The shape of the chamber 35 is optional, depending upon the type of piston (not shown) which may be used. Thus with the dome chamber 35, a dome head piston could be used if it be desired to increase the compression pressure. Otherwise, the height of the dome 35 may be reduced in order to provide for the degree of pressure desired.

A valve 40, cylindrical in shape, is entered through the windows 18 and 19 through the head 13, and the valve is made to have that length which will permit its ends to ride initially on the lower portions of these windows. The diameter of the valve 40 is made to be less than the diameter of the windows 18 and 19. The length of the valve 40 is made to be such that the ends thereof will extend substantially to the outer margins of these windows 18 and 19, these ends being shown, Fig. 3, to terminate just inside thereof and be held against substantial longitudinal travel by abutment of the end plates 41 and 42 respectively removably secured to the head 13 across the windows 18 and 19. The valve 40 extends across the valve cage 22 over the seat 25.

A leaf spring 43 has its ends resting respectively on the top ends of the arms 26 and 27. This spring is secured to these arms by any suitable means such as by cap screws 44 and 45 extending downwardly through slots 46 and 47 in the respective ends of the spring 43 so that the spring 43 is free to extend longitudinally when flexed downwardly. That is, the spring 43 will then tend to increase in overall length when flexed downwardly by reason of the fact that it is initially bowed upwardly.

A screw 48 extends centrally downwardly through the spring 43 to screw-threadedly engage a valve shoe 49. Surrounding the screw 48 is a compression spring 50 adapted to bear by its opposite ends against the spring 43 and the shoe 49. The shoe 49 is provided with arms 51 and 52 extending laterally therefrom to have their outer ends in sliding engagement respectively with the faces 53 and 54 provided on the upper portions of the arms 26 and 27. By suitable adjustment of the screw 48, the degree of pressure of the shoe 49 on the valve 40 therebelow is regulated. In turn, the pressure of the valve against the seat 25 is thus determined. The under side of the shoe 49 is, as indicated, concave in shape to have a surface conforming to the face of the valve.

As indicated in Fig. 4, primarily, the valve 40 is provided with two cut away passages 55 and 56 thereacross, the longitudinal lengths of which are substantially equal to the length of the passage 36. The circumferential lengths of these passageways are made to be such that in one condition, for example, there is a continuous exhaust passageway from the cylinder 10 through the passageway 36, the valve passageway 56, and the exhaust passages 33 and 34 when the valve 40 has revolved counter-clockwise, Fig. 4, when the leading edge of the passageway 56 sweeps across the opening of the passageway 36 through the valve seat 25. Subsequently, after the trailing edge of the passageway 56 leaves the opening 33, the leading edge of that opening 56 will sweep across the opening to the passageway 30 to permit intake flow from the passage 30 across the valve passage 56 into the passageway 36 to the cylinder 10. The same action is obtained when the passageway 55 revolves around to first provide for exhaust discharge, and then second for the intake. The depths of these passageways 55 and 56 are made to be in accordance with the rate of flow desired from and to the cylinder 10.

The valve cage 22 is yieldingly retained in the chamber 17 by means of a pair of leaf springs 57 and 58 which have their outer ends bearing against the top of the head 13 on opposite sides of the chamber 17. These leaf springs are maintained in position across that chamber 17 by any suitable means such as by cap screws 59, one through each end of each spring. These springs are preferably bowed downwardly to rest upon pads 60 and 61 respectively provided on the upper side of the shoe 49. These springs 57 and 58 normally hold the valve 40 through the shoe 49 downwardly against the lower portions of the windows 18 and 19, and the cage 22 is normally pulled upwardly relative to the valve 40 by means of the screw 48 to press the seat 25 into contact with the underside of the valve 40 with slight pressure exerted therebetween.

The valve 40 has a driving plate 600 Fig. 3, fixed in one hollowed out end by means of bolts 610 passing through the plate and through the valve 40 to screw-threadedly engage an opposite end retaining plate 62. Four of such bolts 610 are shown as being employed, Fig. 5. The valve is driven by any suitable means, herein shown as by a chain sprocket 63 revolubly carried by bearings 64 through the cover cap 41 and an Oldham coupling to permit up and down travel of the valve 40 relative to a fixed axis of the sprocket 63. The coupling disk 65 is shown herein as having a feather 66 entering a slot in the plate 600 and the disk 65 receiving a feather 67 extending at right angles to the feather 66, the feather 67 being carried by the disk 68 on the end of the sprocket shaft 69.

In operation, the valve cage 22 will oscillate vertically against the springs 57 and 58 under the fluctuations of pressure produced in the cylinder 10, the degree of these oscillations being less than the clearance between the valve diameter and the diameters of the windows 18 and 19. Also, the under side of the cylindrical portion 23 will clear the bottom of the counter bore 12 and likewise, the shoulder at the juncture of the upper end of the portion 23 with the main body of the cage 22 will also clear the floor of the chamber 17. When the pressure in the cylinder 10 is at its maximum, it will tend to lift the cage 22 upwardly. This lifting action is restrained primarily by the springs 57 and 58 in a yielding manner through pushing of the valve 40 by its seat 25 upwardly against the shoe 49. The springs 57 and 58 are not secured to the shoe 49 but simply bear thereagainst.

It is therefore to be seen that there is provided a simple but most effective manner of mounting a rotary valve over a valve cylinder to maintain the valve on its seat and yet, at the same time, to prevent excessive pressure between the valve and its seat. While the invention has been shown and described in the one particular form, in more or less detail, it is obvious that structural changes may be employed, particularly in the mounting and attachment of the springs or yielding members without departing from the spirit of the invention, and I therefore do not desire to be limited to that precise form beyond the limitations which may be imposed by the following claims.

I claim:

1. The combination with an engine cylinder of an engine head; a valve cage; said head having a chamber therein to receive said cage in sliding relation longitudinally of said cylinder; a cylindrical portion extending from said cage toward said cylinder, said head having a bore slidingly receiving said portion; a cylindrical valve; said head chamber having a circular opening in opposite side walls thereof, the openings having a larger diameter than that of said valve; a valve seat in said cage over said portion, conforming in curvature to that of said valve and extending at most not over one-half of the circumference of said valve; said cage having intake and exhaust passages opening through said seat, and further having a passage leading from said seat through said cage portion, and said valve having slots thereacross to register selectively with openings of said passages; said valve having a length to have its end portions enter respectively into said chamber openings; a shoe bearing on said valve on a side thereof opposite said seat; spring means carried by said cage to retain said shoe against said valve by a predetermined pressure; other spring means yieldingly resisting outward travel of said cage in respect to said head chamber; and means for revolving said valve on said seat.

2. The combination with an engine cylinder of a cylinder head having a chamber therein; a valve cage mounted in said chamber free to reciprocate therein longitudinally of said cylinder, the under side of said cage forming a shiftable cylinder closure; a cylindrical valve extending across said cage to have its axis substantially normal to that of said cylinder; a valve seat conforming to said valve, and provided across said cage between the valve and said cage underside, and limited in circumferential length to not more than half the circumference of the valve, said seat having intake and exhaust passage ports therein, and a port of a passage extending through the cage to its said underside; a shoe riding on said valve opposite said seat; spring means carried by said cage over said shoe; means for varying pressure of the shoe on the valve and consequently on said seat by said spring means; second spring means carried by said head in the path of said shoe yieldingly limiting travel of said cage outwardly from said cylinder; and means for revolving said valve on its seat.

3. For a gas engine cylinder, a head having a chamber therein with an under opening to communicate with the cylinder; a valve cage slidingly fitted in said chamber to be reciprocatable toward and away from said opening; an arcuate seat across said cage, said cage having intake and exhaust passages therethrough with a port for each in said seat, and further having a third passage leading from its side toward said head opening to a port in said seat between the first said ports; a cylindrical valve across said seat, the seat being limited in circumferential length to not more than half that of the valve; an arm extending from said cage on each side and to beyond said valve; a spring secured to the outer ends of said arms across said valve; a shoe under said spring to be held thereby against said valve; a second spring secured to said head to extend across said chamber to bear on said shoe as an outward yielding limit to travel of said cage; and means for rotating said valve.

4. For a gas engine cylinder, a head having a chamber therein with an under opening to communicate with the cylinder; a valve cage slidingly fitted in said chamber to be reciprocatable toward and away from said opening; an arcuate seat across said cage, said cage having intake and exhaust passages therethrough with a port for each in said seat, and further having a third passage leading from its side toward said head opening to a port in said seat between the first said ports; a cylindrical valve across said seat, the seat being limited in circumferential length to not more than half that of the valve; an arm extending from said cage on each side and to beyond said valve; a spring secured to the outer ends of said arms across said valve; a shoe under said spring to be held thereby against said valve; a second spring secured to said head to extend across said chamber to bear on said shoe as an outward yielding limit to travel of said cage; and means for rotating said valve; said head having gas intake and exhaust passages with ports registering with said cage intake and exhaust passages.

5. A gas engine rotary valve head having a chamber with opposing, parallel planar side walls with a gas intake port in one wall and a gas exhaust port in the other wall, a valve cage having an arcuate seat across its upper side, and a gas intake and a gas exhaust passage therethrough, said cage having parallel, planar walls to engage slidingly over said head walls, said cage passages having ports in said seat and in said walls to register with said head wall ports; a cylindrical portion extending downwardly from the under side of said cage and having a passage therethrough with a port in said slot and opening from the underside of said portion; said head having a cylindrical bore extending from said chamber to receive slidingly said cage portion; an arm extending upwardly from said cage on each side of said seat; a cylindrical valve on said seat having slots thereacross for selective registration with said seat ports; a shoe bearing on the upper side of said valve; and spring means carried by said head over said shoe to limit yieldingly outward travel of said valve and said cage in said head chamber.

6. A gas engine rotary valve head having a chamber with opposing, parallel planar side walls with a gas intake port in one wall and a gas exhaust port in the other wall, a valve cage having an arcuate seat across its upper side, and a gas intake and a gas exhaust passage therethrough, said cage having parallel, planar walls to engage slidingly over said head walls said cage passages having ports in said seat and in said walls to register with said head wall ports; a cylindrical portion extending downwardly from the under side of said cage and having a passage therethrough with a port in said slot and opening from the underside of said portion; said head having a cylindrical bore extending from said chamber to receive slidingly said cage portion; an arm extending upwardly from said cage on each side of said seat; a cylindrical valve on said seat having slots thereacross for selective registration with said seat ports; a shoe bearing on the upper side of said valve; and spring means carried by said head over said shoe to limit yieldingly outward travel of said valve and said cage in said head chamber; and second spring means carried by said cage arms for urging said shoe against said valve.

7. A gas engine rotary valve head having a chamber with opposing, parallel planar side walls with a gas intake port in one wall and a gas exhaust port in the other wall, a valve cage having an arcuate seat across its upper side, and a gas intake and a gas exhaust passage therethrough, said cage having parallel, planar walls to engage slidingly over said head walls, said cage passages having ports in said seat and in said walls to register with said head wall ports; a cylindrical portion extending downwardly from the under side of said cage and having a passage therethrough with a port in said slot and opening from the underside of said portion; said head having a cylindrical bore extending from said chamber to receive slidingly said cage portion; an arm extending upwardly from said cage on each side of said seat; a cylindrical valve on said seat having slots thereacross for selective registration with said seat ports; a shoe bearing on the upper side of said valve; and spring means carried by said head over said shoe to limit yieldingly outward travel of said valve and said cage in said head chamber; said head having means for receiving the ends of said valve to limit reciprocating travel of the valve relative to the head.

8. A gas engine rotary valve head having a chamber with opposing, parallel planar side walls with a gas intake port in one wall and a gas exhaust port in the other wall, a valve cage having an arcuate seat across its upper side, and a gas intake and a gas exhaust passage therethrough, said cage having parallel, planar walls to engage slidingly over said head walls, said cage passages having ports in said seat and in said walls to register with said head wall ports; a cylindrical portion extending downwardly from the under side of said cage and having a passage therethrough with a port in said slot and opening from the underside of said portion; said head having a cylindrical bore extending from said chamber to receive slidingly said cage portion; an arm extending upwardly from said cage on each side of said seat; a cylindrical valve on said seat having slots thereacross for selective registration with said seat ports; a shoe bearing on the upper side of said valve; and spring means carried by said head over said shoe to limit yieldingly outward travel of said valve and said cage in said head chamber; and arms extending from said shoe into sliding contact with said cage arms.

ERWIN G. BAKER.

REFERENCES CITED

The following references are of record in the file of this patent:

UNITED STATES PATENTS

| Number | Name | Date |
| --- | --- | --- |
| 661,865 | Guillaume | Nov. 13, 1900 |
| 1,134,726 | Caulkins et al. | Apr. 6, 1915 |
| 1,181,974 | Blye | May 2, 1916 |
| 1,252,753 | Wehr | Jan. 8, 1918 |